United States Patent Office 3,130,007
Patented Apr. 21, 1964

3,130,007
CRYSTALLINE ZEOLITE Y
Donald W. Breck, Tonawanda, N.Y., assignor to Union Carbide Corporation, a corporation of New York
No Drawing. Filed May 12, 1961, Ser. No. 109,487
30 Claims. (Cl. 23—113)

This invention relates to a synthetic, crystalline, zeolitic sodium aluminosilicate of the molecular sieve type which is useful as an adsorbent, and to a method for making the composition.

It is an object of this invention to provide a novel, synthetic, crystalline, zeolitic, sodium aluminosilicate of the molecular sieve type which is suitable for use as an adsorbent.

Another object of the present invention is to provide a method of making the novel adsorbent of the invention.

Other objects will be apparent from the subsequent disclosure and appended claims.

Naturally-occurring, crystalline, hydrated, metal aluminosilicates are called zeolites. The synthetic, crystalline, sodium aluminosilicate described herein will be designated hereinafter as "zeolite Y" to distinguish it from other materials.

Certain adsorbents, including zeolite Y, selectively adsorb molecules on the basis of the size and shape of the adsorbate molecule and are called molecular sieves. Molecular sieves have a sorption area available on the inside of a large number of uniformly sized pores of molecular dimensions. With such an arrangement, molecules of a certain size and shape enter the pores and are adsorbed, while larger or differently-shaped molecules are excluded. Not all adsorbents behave in the manner of molecular sieves. The common adsorbents, charcoal and silica gel, for example, do not exhibit molecular sieve action.

The crystals of zeolite Y are basically three-dimensional frameworks of $SiO_4$ and $AlO_4$ tetrahedrons cross-linked by the sharing of oxygen atoms. The electrovalence of each tetrahedron containing aluminum is balanced by the presence in the aluminosilicate framework of a cation such as an alkali metal ion. The void spaces in the framework are occupied by water molecules.

Dehydration to effect the loss of the water of hydration results in a crystal interlaced with channels of molecular dimensions that offer very high surface areas for the adsorption of foreign molecules. Factors influencing occlusion by activated zeolite Y crystals are the size and polarizing power of the interstitial cation, the polarizability and polarity of the occluded molecules, the dimensions and shape of the sorbed molecule relative to those of the channels, the duration and severity of dehydration and desorption, and the presence of foreign molecules in the interstitial channels. It will be understood that the refusal characteristics of zeolite Y are quite as important as the adsorptive or positive adsorption characteristics if effective separations are to be obtained.

The chemical formula for zeolite Y expressed in terms of moles of oxides may be written as $$0.9 \pm 0.2 \, Na_2O : Al_2O_3 : w \, SiO_2 : x \, H_2O$$

wherein $w$ is a value greater than 3 up to about 6 and $x$ may be a value up to about 9.

Zeolite Y has a characteristic X-ray power difffraction pattern which may be employed to identify zeolite Y. The X-ray powder difffraction data are shown in Table A. The values for the interplanar spacing $d$, are expressed in angstrom units. The relative intensities of the lines of the X-ray powder diffraction pattern are expressed as VS, very strong; S, strong; M, medium; W, weak; and VW, very weak.

TABLE A

| hkl | $h^2+k^2+l^2$ | $d$, A. | Relative Intensity |
|---|---|---|---|
| 111 | 3 | 14.37–14.15 | VS |
| 220 | 8 | 8.80– 8.67 | M |
| 311 | 11 | 7.50– 7.39 | M |
| 331 | 19 | 5.71– 5.62 | S |
| 333, 511 | 27 | 4.79– 4.72 | M |
| 440 | 32 | 4.46– 4.33 | M |
| 531 | 35 | 4.29– 4.16 | W |
| 600, 442 | 36 | 4.13– 4.09 | W |
| 620 | 40 | 3.93– 3.88 | W |
| 533 | 43 | 3.79– 3.74 | S |
| 631 | 46 | 3.66– 3.62 | M |
| 711, 551 | 51 | 3.48– 3.43 | VW |
| 642 | 56 | 3.33– 3.28 | S |
| 733 | 67 | 3.04– 3.00 | M |
| 822, 660 | 72 | 2.93– 2.89 | M |
| 751, 555 | 75 | 2.87– 2.83 | S |
| 840 | 80 | 2.78– 2.74 | M |
| 911, 753 | 83 | 2.73– 2.69 | W |
| 664 | 88 | 2.65– 2.61 | M |
| 844 | 96 | 2.54– 2.50 | VW |
| 10, 0, 0; 860 | 100 | 2.49– 2.45 | VW |
| 10, 2, 0; 862 | 104 | 2.44– 2.40 | VW |
| 10, 2, 2; 666 | 108 | 2.39– 2.36 | M |
| 10, 4, 0; 864 | 116 | 2.29– 2.25 | VW |
| 11, 1, 1; 775 | 123 | 2.24– 2.21 | VW |
| 880 | 128 | 2.20– 2.17 | W |
| 11, 3, 1; 971; 955 | 131 | 2.18 –2.14 | VW |
| 11, 3, 3; 973 | 139 | 2.11– 2.08 | W |
| 12, 0, 0; 884 | 144 | 2.07– 2.04 | VW |
| 11, 5, 2; 10, 7, 1; 10, 5, 5 | 150 | 2.03– 2.00 | VW |
| 10, 8, 2; 13, 1, 1; 11, 7, 1; 11, 5, 5; 993 | 168, 171 | 1.92– 1.89 | VW |
| 13, 3, 1; 11, 7, 3; 977 | 179 | 1.86– 1.83 | VW |
| 13, 3, 3; 995; 838 | 187, 192 | 1.82– 1.79 | VW |
| 13, 5, 1; 11, 7, 5 | 195 | 1.78– 1.76 | VW |
| 14, 2, 0; 10, 10, 0; 10, 8, 6 | 200 | 1.76– 1.73 | W |
| 13, 5, 4; 11, 8, 5 | 210 | 1.71– 1.69 | W |

In producing zeolite Y, representative reactants are activated alumina, gamma alumina, alumina trihydrate and sodium aluminate as a source of alumina. Silica may be obtained from sodium silicate, silica gels, silicic acid, aqueous colloidal silica sols and reactive amorphous solid silicas. The latter two groups are preferred when zeolite Y products having molar $SiO_2/Al_2O_3$ ratios above about 4.5 are to be produced; however, these silica sources may if desired also be employed for making zeolite Y products having $SiO_2/Al_2O_3$ ratios of below about 4.5. The preparation of typical silica sols which are suitable for use in the process of the present invention are described in U.S. Patent No. 2,574,902 and U.S. Patent No. 2,597,872. Typical of the group of reactive amorphous solid silicas, preferably having an ultimate particle size of less than 1 micron are such materials as fume silicas, chemically precipitated silicas, and precipitated silica sols, and including silicas such as those known by such trade names as "Santocel," "Cab-o-sil," "Hi-Sil," and "QUSO." Finely divided "Vycor" glass powder may also be used. Sodium hydroxide may supply the sodium ion and also assist in controlling pH.

When an aqueous colloidal silica sol or a reactive amorphous solid silica is employed as the major source of silica, zeolite Y may be prepared by preparing an aqueous sodium aluminosilicate mixture having a composition, expressed in terms of oxide-mole-ratios, which falls within one of the ranges shown in Table I.

TABLE I

| | Range 1 | Range 2 | Range 3 |
|---|---|---|---|
| $Na_2O/SiO_2$ | 0.20 to 0.40 | 0.41 to 0.60 | 0.61 to 0.80 |
| $SiO_2/Al_2O_3$ | 10 to 40 | 10 to 30 | 7 to 30 |
| $H_2O/Na_2O$ | 25 to 60 | 20 to 60 | 20 to 60 | maintaining the mixture at a temperature in the range of from about 20° C. to 125° C. until crystals are formed, and separating the crystals from the mother liquor.

The preferred composition range for producing sodium zeolite Y when the major source of silica is an aqueous colloidal silica sol or a reactive amorphous solid silica expressed in terms of oxide-mole-ratios, is shown in Table II.

TABLE II

|  | Range 4 |
|---|---|
| $Na_2O/SiO_2$ | 0.4 to 0.6 |
| $SiO_2/Al_2O_3$ | 15 to 25 |
| $H_2O/Na_2O$ | 20 to 50 |

The crystallization is most satisfactorily effected at a temperature of from about 80° C. to 125° C. At lower temperatures, the crystals which form are smaller in size than those formed at the higher temperature.

When silica sources such as sodium silicate, silica gels or silicic acid are employed as the major source of silica, zeolite Y may be prepared by preparing an aqueous sodium aluminosilicate mixture having a composition, expressed in terms of oxide-mole-ratios, falling within any one of the ranges shown in Table III.

TABLE III

|  | Range 5 | Range 6 | Range 7 |
|---|---|---|---|
| $Na_2O/SiO_2$ | 0.6 to 1.0 | 1.5 to 1.7 | 1.9 to 2.1 |
| $SiO_2/Al_2O_3$ | 8 to 30 | 10 to 30 | about 10 |
| $H_2O/Na_2O$ | 12 to 90 | 20 to 90 | 40 to 90 |

The preferred compositions for preparing zeolite Y from sodium silicate, silica gels or silicic acid are shown in Table IV.

TABLE IV

|  | Range 8 | Range 9 |
|---|---|---|
| $Na_2O/SiO_2$ | 0.70 to 0.90 | 1.5 to 1.7 |
| $SiO_2/Al_2O_3$ | 10 to 25 | 10 to 20 |
| $H_2O/Na_2O$ | 12 to 90 | 20 to 90 |

The crystallization is conducted by holding the reaction mixture in the temperature range of about 20° C. to 125° C. until the crystalline product is obtained. In this range it is preferred to use temperatures from about 80° C. to 125° C.

In general the lower temperatures may require crystallization times somewhat longer than is usually considered desirable in commercial practice. The zeolite Y product obtained at these lower temperatures may tend toward particle sizes smaller than those of the zeolite Y products prepared at the higher temperatures.

In the practice of this invention, when silica sources such as sodium silicate, silica gel or silicic acid are used as the major source of silica in the aqueous sodium aluminosilicate mixture as hereinbefore described, the zeolite Y compositions as prepared usually have silica/alumina ($SiO_2/Al_2O_3$) molar ratios ranging from greater than 3 up to about 3.9. In this range the unit cell constant, $a_0$, of the crystals changes from 24.87 to 24.77 A. When zeolite Y product compositions having silica/alumina molar ratios above about 3.9 are desired, silicate sources such as the aqueous colloidal silica sols and the reactive amorphous solid silicas are preferable as the major source of silica in the aqueous sodium aluminosilicate mixtures as hereinbefore set forth.

When substantially pure sodium zeolite Y compositions having a product silica-to-alumina mole ratio up to about 6 are desired, they may be prepared from reactant mixtures, wherein an aqueous colloidal silica sol or a reactive amorphous solid silica is employed as the major source of silica, which fall within one of the following ranges.

Range 10:
$Na_2O/SiO_2$ _____ 0.28–0.30
$SiO_2/Al_2O_3$ _____ 8–10
$H_2O/Na_2O$ _____ 30–50

Range 11:
$Na_2O/SiO_2$ _____ About 0.4
$SiO_2/Al_2O_3$ _____ 10–27
$H_2O/Na_2O$ _____ 30–50

The reactant mixture is first digested at ambient or room-temperature and then heated to an elevated temperature and maintained at this elevated temperature until sodium zeolite Y having the higher silica-to-alumina molar ratio has crystallized. Ambient temperature, as used herein, means the air temperature normally encountered in a plant designed for the production of sodium zeolite Y, namely, from about 55° F. to about 100° F.

The effect of the ambient temperature digestion step has been found beneficial, especially when preparing commercial size quantities, for all the processes for producing zeolite Y as hereinabove disclosed. The effect of the ambient temperature digestion step on the product silica-to-alumina molar ratio as well as the product quality can be demonstrated by examining the representative data of Table V, below, wherein two products made by the same procedure, except that one reactant mixture was allowed to digest at ambient temperature while the other was not given this room-temperature digestion step, are compared. In both cases an aqueous colloidal silica sol was employed as the major source of silica and the initial reactant composition was as follows:

$Na_2O/SiO_2$ _____ 0.4
$SiO_2/Al_2O_3$ _____ 20
$H_2O/Na_2O$ _____ 40

TABLE V

*Digestion Steps*

| Digestion, Room Temp., Hr. | Crystallization, 100° C., Hr. | Product Composition |
|---|---|---|
| 0 | 72 | 63% sodium zeolite Y ($SiO_2/Al_2O_3 < 5$) plus amorphous substances. |
| 24 | 50 | 92% sodium zeolite Y ($SiO_2/Al_2O_3 = 5.0$). |

It is evident from the examples of Table V that the use of an ambient temperature digestion step results in the formation of a relatively higher purity zeolite Y having a higher silica-to-alumina molar ratio. The ambient temperature digestion step has been found to be particularly advantageous in producing the higher end of the silica-to-alumina product ranges for particular silica sources. That is, when silica sources such as sodium silicate are used, the ambient temperature digestion step improves the purity of zeolite Y compositions having silica-to-alumina molar ratios greater than about 3.5 and when silica sources such as aqueous colloidal silica sols are used, the ambient temperature digestion step improves the purity of and produces zeolite Y compositions having silica-to-alumina molar ratios greater than about 4.5.

The oxide-mole ratios which define the initial composition of the reactant mixtures necessary to produce higher silica-to-alumina product mole ratios in zeolite Y by the process of the present invention are given in ranges 10 and 11. The following values are the particularly preferred reactant mixture oxide-mole ratios:

Range 12
- $Na_2O/SiO_2$ ---------------------------------- 0.30
- $SiO_2/Al_2O_3$ -------------------------------- 8–10
- $H_2O/Na_2O$ ---------------------------- About 40

Range 13
- $Na_2O/SiO_2$ ---------------------------------- 0.4
- $SiO_2/Al_2O_3$ -------------------------------- 10–20
- $H_2O/Na_2O$ ---------------------------- About 40

Range 14
- $Na_2O/SiO_2$ ---------------------------------- 0.42
- $SiO_2/Al_2O_3$ -------------------------- About 27
- $H_2O/Na_2O$ ---------------------------- About 33

Table VI below, is representative of the sodium zeolite Y preparations within the disclosed higher product silica-to-alumina molar ratios wherein an aqueous colloidal silica sol was employed as the major source of silica and wherein a digestion step at ambient or room-temperature was included in the process for production.

TABLE VI

| Molar Reactant Composition | | | Product Purity, Percent [1] | Product $SiO_2/Al_2O_3$ |
|---|---|---|---|---|
| $Na_2O/SiO_2$ | $SiO_2/Al_2O_3$ | $H_2O/Na_2O$ | | |
| 0.4 | 10 | 40 | 92 | 5.0 |
| 0.4 | 20 | 40 | 92 | 5.0 |
| 0.42 | 27 | 33 | [2] 100 | 5.1 |
| 0.3 | 8 | 40 | 100 | 5.2 |
| 0.3 | 10 | 40 | 96 | 5.4 |
| 0.3 | 10 | 40 | 95 | 5.5 |
| 0.3 | 10 | 40 | 95 | 5.6 |

[1] X-ray analysis.
[2] By adsorption measurements.

The room-temperature digestion period for reactant composition mixtures of Tables I through IV and within range 11 and the preferred ranges 13 and 14 should be at least about 16 hours, with about 24–32 hours as the preferred period. Longer periods, beyond about 40 hours, are not only impractical when production scale quantities are desired but when operating in ranges 11, 13, and 14 also tend to contribute to a decrease in the $SiO_2/Al_2O_3$ ratio of the products to below 5. For reactant composition range 10 and the preferred range 12 the optimum practical ambient or room-temperature digestion period is also about 24 hours but the minimum period is about 20 hours. Again, it is preferable to limit the duration of this step to about 40 hours.

When an ambient temperature digestion step is used, the crystallization or elevated-temperature digestion step should be conducted at a temperature between about 90° C. and 105° C., preferably between 95° C. and 100° C. The reactant mixture is maintained at this elevated temperature until the crystals are formed. If the crystallization or elevated-temperature digestion step is too short, amorphous alminosilicates may be observed, whereas overlengthened periods usually result in a decrease in $SiO_2/Al_2O_3$ content of the zeolite Y product and in the conversion of the sodium zeolite Y product to other species of crystalline zeolites. For reactant composition ranges 11, 13, and 14 the crystallization or elevated-temperature digestion step may be conducted for a period of from about 24 to about 65 hours with about 50 hours the preferred period. When the reactant composition is within range 10 or the preferred range 12 the crystallization step may be conducted for a period of from about 3 to about 8 days, with the preferred period from about 4 to about 6 days.

The following examples are representative of the process of the invention for producing sodium zeolite Y:

EXAMPLE I

In an example of the invention, five grams of sodium aluminate containing 30.0 wt.-percent $Na_2O$, 44.1 wt.-percent $Al_2O_3$ and 25.9 wt.-percent $H_2O$, and 22 grams of sodium hydroxide (containing 77.5 wt.-percent $Na_2O$ were dissolved in 89.5 milliliters of distilled water. This solution was added to 124.2 grams of an aqueous colloidal silica sol containing 29.5 wt.-percent $SiO_2$. The resultant mixture, which had the molar composition 13.9 $Na_2O$:$Al_2O_3$:28.2 $SiO_2$:471 $H_2O$ was stirred until homogeneous. The glass reaction vessel was sealed and placed in a steam bath at 100° C. for a period of 21 hours to produce crystallization of the reaction mixture. After crystallization was complete, the solids were separated from the mother liquor by suction filtration and washed with distilled water until the pH of the wash effluent was about 10.5. The powder was then dried at 100° C. The product was identified as zeolite Y by means of X-ray diffraction patterns. Chemical analysis indicated a product composition of 0.92 $Na_2O$:1.00 $Al_2O_3$:4.00 $SiO_2$:7.0 $H_2O$ The above product has a cubic unit cell having an X-ray powder diffraction pattern characterized by the following data wherein "I" is the intensity and "d" is the interplanar spacing.

| $h^2+k^2+l^2$ | 100 I/I Max. | d (obs.) in A. | $h^2+k^2+l^2$ | 100 I/I max. | d (obs.) in A. |
|---|---|---|---|---|---|
| 3 | 100 | 14.3 | 75 | 48 | 2.858 |
| 8 | 29 | 8.75 | 80 | 20 | 2.767 |
| 11 | 24 | 7.46 | 83 | 7 | 2.717 |
| 19 | 44 | 5.68 | 88 | 19 | 2.638 |
| | | | 91 | 11 | 2.595 |
| 27 | 23 | 4.76 | 108 | 13 | 2.382 |
| 32 | 35 | 4.38 | 123 | 8 | 2.188 |
| 40 | 12 | 3.91 | 131 | 4 | 2.162 |
| 43 | 47 | 3.775 | 139 | 8 | 2.100 |
| 48 | 4 | 3.573 | 144 | 7 | 2.063 |
| 51 | 9 | 3.466 | 164 | 4 | 1.933 |
| 56 | 37 | 3.308 | 168 | 5 | 1.910 |
| 59 | 8 | 3.222 | 195 | 5 | 1.772 |
| 67 | 16 | 3.024 | 200 | 9 | 1.750 |
| 72 | 21 | 2.917 | 211 | 12 | 1.704 |

EXAMPLE II

In another example of this invention, five grams of sodium aluminate, containing 30.0 weight-percent $Na_2O$, 44.1 weight-percent $Al_2O_3$ and 25.9 weight-percent $H_2O$, and 27.3 grams of sodium hydroxide (containing 77.5 weight-percent $Na_2O$) were dissolved in 219 milliliters of water. This solution was then added to 124.2 grams of an aqueous colloidal silica sol containing 29.5 weight-percent silica to prepare a mixture having a molar composition of 16.9 $Na_2O$:$Al_2O_3$:28.2 $SiO_2$:808 $H_2O$ This mixture was stirred until homogeneous, and the reaction vessel was then sealed and placed in an autoclave at 120° C. for three hours. Crystals formed in the reaction mixture; when crystallization was complete, the solids were separated from the mother liquor by suction filtration and washed with distilled water until the pH of the wash effluent was about 10.5. The resultant powder was then dried at 100° C. The product was identified as zeolite Y by means of its X-ray diffraction pattern. Chemical analysis of the product showed a composition of 1.00 $Na_2O$:1.00 $Al_2O_3$:3.69 $SiO_2$:6.7 $H_2O$

EXAMPLE III

In another example of this invention, 5.9 grams of sodium aluminate, containing 31.0 weight-percent $Na_2O$, 45.1 weight-percent $Al_2O_3$ and 23.0 weight-percent $H_2O$, and 14.4 grams of sodium hydroxide (containing 77.5 weight-percent $Na_2O$) were dissolved in 76.8 milliliters of water. This solution was then added to 100 grams of an aqueous colloidal silica sol containing 31.6 weight-percent silica to prepare a mixture having a molar composition of $$8\ Na_2O:Al_2O_3:20\ SiO_2:320\ H_2O$$

This mixture was stirred until homogeneous, and the reaction vessel was then sealed and placed in a steam bath at 100° C. Crystals formed in the reaction mixture; when crystallization was complete, the solids were separated from the mother liquor by suction filtration and washed with distilled water until the pH of the wash effluent was about 10.0. The resultant powder was then dried at 100° C. The product was identified as zeolite Y, with trace amounts of another synthetic zeolite, by means of its X-ray diffraction pattern. Chemical analysis of the product showed a composition of $$0.91\ Na_2O:1.00\ Al_2O_3:4.5\ SiO_2:8\ H_2O$$

EXAMPLE IV

In another example of this invention, 11.5 grams of sodium aluminate, containing 30.0 weight-percent $Na_2O$, 46.6 weight-percent $Al_2O_3$ and 23.4 weight-percent $H_2O$, and 6.9 grams of sodium hydroxide (containing 77.5 weight percent $Na_2O$) were dissolved in 233 milliliters of water. This solution was then added to 100 grams of a water solution of sodium silicate containing 19.7 weight-percent $Na_2O$ and 36.6 weight-percent $SiO_2$. The resultant mixture, which had the molar composition $$9\ Na_2O:Al_2O_3:12\ SiO_2:314\ H_2O$$

was stirred until homogeneous. The reaction vessel was sealed and placed in a steam bath at 100° C. for a period of 67 hours to produce crystallization of the reaction mixture. The solids were separated from the mother liquor by suction filtration and washed with distilled water until the pH of the wash effluent was 10.0 to 10.5. The powder was dried at 100° C. The product was identified as zeolite Y, with trace amounts of another synthetic crystalline zeolite, by means of X-ray diffraction patterns. Chemical analysis indicated a product composition of $$0.92\ Na_2O:1.00\ Al_2O_3:3.29\ SiO_2:7\ H_2O$$

EXAMPLE V

In still another example of this invention, 7.0 grams of sodium aluminate, containing 30.0 weight-percent $Na_2O$, 46.6 weight-percent $Al_2O_3$ and 23.4 weight-percent $H_2O$, and 21 grams of sodium hydroxide (containing 77.5 weight-percent $Na_2O$) were dissolved in 280 milliliters of water. This solution was then added to 100 grams of a water solution of sodium silicate containing 19.7 weight-percent $Na_2O$ and 35.6 weight-percent $SiO_2$. The resultant mixture, which had the molar composition $$20\ Na_2O:Al_2O_3:20\ SiO_2:600\ H_2O$$

was stirred until homogeneous. The reaction vessel was sealed and placed in a steam bath at 100° C. for a period of 67 hours to produce crystallization of the reaction mixture. The solids were separated from the mother liquor by suction filtration and washed with distilled water until the pH of the wash effluent was 10.0 to 10.5. The powder was dried at 100° C. The product was identified as zeolite Y, with trace amounts of another synthetic zeolite, by means of X-ray diffraction patterns. Chemical analysis indicated a product composition of $$1.0\ Na_2O:1.00\ Al_2O_3:3.4\ SiO_2:8\ H_2O$$

EXAMPLE VI

In still another example of this invention, 27.4 grams of sodium aluminate, containing 31.0 weight-percent $Na_2O$, 45.1 weight-percent $Al_2O_3$ and 23.0 weight-percent $H_2O$, and 95.5 grams of sodium hydroxide (containing 77.5 weight-percent $Na_2O$) were dissolved in 375 milliliters of water. This solution was then added to 460 grams of an aqueous colloidal silica sol containing 31.6 weight-percent silica to prepare a mixture having a molar composition of $$11\ Na_2O:Al_2O_3:20\ SiO_2:330\ H_2O$$

This mixture was stirred until homogeneous, and the reaction vessel was sealed and placed in a water bath at 25° C. for a period of 8 weeks. Crystals formed in the reaction mixture; when crystallization was complete, the solids were separated from the mother liquor by suction filtration and washed with distilled water until the pH of the wash effluent was about 10.0. The resultant powder was then dried at 100° C. Chemical analysis indicated a product composition of $$1.02\ Na_2O:1.00\ Al_2O_3:3.5\ SiO_2:8\ H_2O$$

EXAMPLE VII

In still another example of this invention, 80 grams of sodium aluminate, containing 30.0 weight-percent $Na_2O$, 46.6 weight-percent $Al_2O_3$ and 23.4 weight-percent $H_2O$, and 286 grams of sodium hydroxide (containing 77.5 weight-percent $Na_2O$) were dissolved in 1024 milliliters of water. This solution was then added to 1840 grams of an aqueous colloidal silica sol containing 31.6 weight-percent silica to prepare a mixture having a molar composition of $$11\ Na_2O:Al_2O_3:27\ SiO_2:366\ H_2O$$

This mixture was stirred until homogeneous, and the reaction vessel was sealed and placed in a steam bath at 100° C. Crystals formed in the reaction mixture; when crystallization was complete, the solids were separated from the mother liquor by suction filtration and washed with distilled water until the pH of the wash effluent was about 10.0. The resultant powder was then dried at 100° C. Chemical analysis indicated product composition of $$0.94\ Na_2O:1.00\ Al_2O_3:4.8\ SiO_2:9\ H_2O$$

The above product had a cubic unit cell having an X-ray powder diffraction pattern characterized by the following data wherein "I" is the intensity and "d" is the interplanar spacing.

| hkl | $h^2+k^2+l^2$ | $100 \times I/I_{max}$ | d (obs.) in A. |
|---|---|---|---|
| 111 | 3 | 100 | 14.3 |
| 220 | 8 | 18 | 8.73 |
| 311 | 11 | 12 | 7.45 |
| 331 | 19 | 31 | 5.67 |
| 333, 511 | 27 | 13 | 4.75 |
| 440 | 32 | 20 | 4.37 |
| 620 | 40 | 7 | 3.90 |
| 533 | 43 | 30 | 3.77 |
| 444 | 48 | 2 | 3.57 |
| 551, 711 | 51 | 3 | 3.46 |
| 642 | 56 | 20 | 3.30 |
| 553, 731 | 59 | 4 | 3.22 |
| 733 | 67 | 8 | 3.02 |
| 660, 822 | 72 | 11 | 2.90 |
| 555, 751 | 75 | 24 | 2.85 |
| 840 | 80 | 8 | 2.76 |
| 753, 911 | 83 | 2 | 2.71 |
| 664 | 88 | 8 | 2.63 |
| 931 | 91 | 4 | 2.59 |
| 844 | 96 | 1 | 2.52 |
| 862; 10, 2, 0 | 104 | 1 | 2.42 |
| 666; 10, 2, 2 | 108 | 5 | 2.38 |
| 775; 11, 1, 1 | 123 | 1 | 2.23 |
| 880 | 128 | 3 | 2.18 |
| 955; 971; 11, 3, 1 | 131 | 2 | 2.16 |
| 866; 10, 6, 0 | 136 | 1 | 2.12 |
| 973; 11, 3, 3 | 139 | 4 | 2.10 |
| 984; 12, 0, 0 | 144 | 2 | 2.06 |
| 886; 10, 8, 0; 12, 4, 2 | 164 | 1 | 1.93 |
| 10, 8, 2 | 168 | 2 | 1.91 |
| 977; 11, 7, 3; 12, 3, 1 | 179 | 1 | 1.86 |
| 995; 13, 3, 3 | 187 | 1 | 1.81 |
| 11, 7, 5; 13, 5, 1 | 195 | 1 | 1.77 |
| 10, 8, 6; 10, 10, 0; 14, 2, 0 | 200 | 3 | 1.75 |
| 997; 11, 9, 3 | 211 | 4 | 1.70 |

EXAMPLE VIII

In still another example of this invention, 54.8 grams of sodium aluminate, containing 30.0 weight-percent $Na_2O$, 46.6 weight-percent $Al_2O_3$ and 23.4 weight-percent $H_2O$, and 191 grams of sodium hydroxide (containing 77.5 weight-percent $Na_2O$) were dissolved in 750 milliliters of water. This solution was then added to 920 grams of an aqueous colloidal silica sol containing 31.6 weight-percent silica to prepare a mixture having a molar composition of 11 Na$_2$O:Al$_2$O$_3$:20 SiO$_2$:330 H$_2$O This mixture was stirred until homogeneous, and the reaction vessel was sealed and placed in a steam bath at 100° C. Crystals formed in the reaction mixture; when crystallization was complete, the solids were separated from the mother liquor by suction filtration and washed with distilled water until the pH of the wash effluent was about 10.0. The resultant powder was then dried at 100° C. Chemical analysis indicated a product composition of 1.03 Na$_2$O:1.00 Al$_2$O$_3$:3.8 SiO$_2$:8 H$_2$O The above product had a cubic unit cell having an X-ray powder diffraction pattern characterized by the following data wherein "I" is the intensity and "d" is the interplanar spacing.

| hkl | $h^2+k^2+l^2$ | 100×I/I max. | d (obs.) in A. |
|---|---|---|---|
| 111 | 3 | 100 | 14.3 |
| 220 | 8 | 22 | 8.78 |
| 311 | 11 | 17 | 7.47 |
| 331 | 19 | 41 | 5.68 |
| 422 | 24 | 7 | 5.05 |
| 333, 511 | 27 | 17 | 4.78 |
| 440 | 32 | 26 | 4.38 |
| 620 | 40 | 10 | 3.92 |
| 533 | 43 | 55 | 3.78 |
| 551, 711 | 51 | 5 | 3.46 |
| 642 | 56 | 46 | 3.31 |
| 553, 731 | 59 | 10 | 3.23 |
| 733 | 67 | 14 | 3.03 |
| 660, 822 | 72 | 26 | 2.92 |
| 555, 751 | 75 | 55 | 2.86 |
| 840 | 80 | 22 | 2.77 |
| 753, 911 | 83 | 6 | 2.72 |
| 664 | 88 | 20 | 2.64 |
| 931 | 91 | 11 | 2.60 |
| 844 | 96 | 4 | 2.53 |
| 852; 10, 2, 0 | 104 | 2 | 2.43 |
| 666; 10, 2, 2 | 108 | 11 | 2.39 |
| 775; 11, 1, 1 | 123 | 3 | 2.24 |
| 880 | 128 | 9 | 2.19 |
| 955; 971; 11, 3, 1 | 131 | 5 | 2.17 |
| 973; 11, 3, 3 | 139 | 7 | 2.10 |
| 884; 12, 0, 0 | 144 | 4 | 2.07 |
| 886; 10, 8, 0; 12, 4, 2 | 164 | 2 | 1.94 |
| 10, 8, 2 | 168 | 5 | 1.91 |
| 995; 13, 3, 3 | 187 | 5 | 1.81 |
| 11, 7, 5; 13, 5, 1 | 195 | 4 | 1.77 |
| 10, 8, 6; 10, 10, 0; 14, 2, 0 | 200 | 8 | 1.75 |
| 997; 11, 9, 3 | 211 | 10 | 1.71 |

EXAMPLE IX

In another example of the invention, 8.9 grams of sodium aluminate, containing 30.0 weight-percent Na$_2$O, 46.6 weight-percent Al$_2$O$_3$ and 23.4 weight-percent H$_2$O, and 28.4 grams of sodium hydroxide (containing 77.5 weight-percent Na$_2$O) were dissolved in 421 milliliters of water. This solution was then added to a water solution consisting of 100 grams of sodium silicate (containing 19.7 weight-percent Na$_2$O and 36.6 weight-percent SiO$_2$) diluted with 420 milliliters of water. The resultant mixture, which had the molar composition 13.5 Na$_2$O:Al$_2$O$_3$:15 SiO$_2$:1215 H$_2$O was stirred until homogeneous. The reaction vessel was sealed and placed in a steam bath at 100° C. for a period of 40 hours to produce crystallization of the reaction mixture. The crystallized product had settled to the bottom of the vessel and the supernatant liquid was clear. The solids were separated from the mother liquor by suction filtration and washed with distilled water until the pH of the wash effluent was about 10. The powder was dried at 100° C. The product was identified as zeolite Y by means of X-ray diffraction patterns. Chemical analysis indicated a product composition of 1.0 Na$_2$O:1.00 Al$_2$O$_3$:3.87 SiO$_2$:7 H$_2$O Zeolite Y may also be prepared at temperatures up to about 175° C. However, for such a synthesis, the reaction mixture must be prepared from an aqueous colloidal silica sol or a reactive amorphous solid silica. The reaction mixture should have the composition shown in Table VII.

TABLE VII

| | |
|---|---|
| Na$_2$O/SiO$_2$ | About 0.6 |
| SiO$_2$/Al$_2$O$_3$ | 10 to 35 |
| H$_2$O/Na$_2$O | About 41 |

The reaction mixture is maintained at a temperature of from about 20° C. up to about 175° C. until crystallization occurs, and the crystals are separated from the mother liquor. As with the other processes, the preferred temperature range is near the upper limit in order to shorten the crystallization time.

EXAMPLE X

In an example of the higher temperature synthesis, 5.43 grams of sodium aluminate and 22.3 grams of sodium hydroxide were dissolved in 144.2 grams of water. This solution was then added to 100.0 grams of an aqueous colloidal silica sol containing 29.7 weight-percent silica to prepare a mixture having a molar composition of 12.2 Na$_2$O:Al$_2$O$_3$:20 SiO$_2$:496 H$_2$O This mixture was stirred until homogeneous, and the glass reaction vessel placed inside a stainless steel container, which was then sealed and placed in an oil bath at 150° C. for 5 hours. Crystals formed in the reaction mixture; when crystallization was complete, the solids were separated from the mother liquor by suction filtration and washed with distilled water until the pH of the wash effluent was about 10.0. The powder was dried at 110° C. The product was identified as zeolite Y by means of X-ray diffraction patterns. Chemical analysis indicated a product composition of 0.98 Na$_2$O:1.00 Al$_2$O$_3$:3.65 SiO$_2$:5.5 H$_2$O

EXAMPLE XI

In still another example of this invention 5.43 grams of sodium aluminate and 22.3 grams of sodium hydroxide were dissolved in 144.2 grams of water. This solution was then added to 100.0 grams of an aqueous colloidal silica sol containing 29.7 weight-percent silica to prepare a mixture having a molar composition of 12.2 Na$_2$O:Al$_2$O$_3$:20 SiO$_2$:496 H$_2$O This mixture was stirred until homogeneous, and the glass reaction vessel placed inside a stainless steel container, which was then sealed and placed in an air oven at 175° C. for 3 hours. Crystals formed in the reaction mixture; when crystallization was complete, the solids were separated from the mother liquor by suction filtration and washed with distilled water until the pH of the wash effluent was about 10.0. The powder was dried at 110° C. The product was identified as zeolite Y, with a minor amount of another synthetic zeolite, by means of its X-ray diffraction pattern. The cubic unit cell dimension was calculated to be 24.79 A.

The following examples are representative of the process of the invention for producing high silica-to-alumina sodium zeolite Y:

EXAMPLE XII

In an example of the invention, 10.86 grams of sodium aluminate, containing 30.7 wt.-percent Na$_2$O, 46.4 wt.-percent Al$_2$O$_3$, and 23.1 wt.-percent H$_2$O, and 7.6 grams sodium hydroxide containing 76.5 wt.-percent Na$_2$O were dissolved in 32.3 grams of distilled water. After cooling, this solution was added to 100 grams of an aqueous colloidal silica sol containing 30.2 wt.-percent SiO$_2$. The resultant mixture, which has the molar composition 3.0 Na$_2$O:Al$_2$O$_3$:10 SiO$_2$:120 H$_2$O was stirred until homogeneous. The glass reaction vessel was sealed and allowed to stand quiescently at room temperature for 24 hours. Next the vessel was placed in a steam bath at 100° C. and allowed to digest for 142 hours. The solids were separated from the mother liquor by filtration, washed to a pH of about 8, and dried at 110° C. By means of X-ray techniques the crystalline product was identified as 94% zeolite Y having a $SiO_2/Al_2O_3$ ratio of about 5.6.

EXAMPLE XIII

The procedure of Example XII was repeated, using 13.6 grams of sodium aluminate, 6.47 grams of sodium hydroxide, 32 grams of water and 100 grams of the aqueous colloidal silica sol to give a reactant mixture having the molar composition $$2.4\ Na_2O:Al_2O_3:8\ SiO_2:96\ H_2O$$

After a room-temperature digestion period of 24 hours and a digestion or crystallization period of 72 hours at 100° C. by means of X-ray techniques the product was identified as 100% zeolite Y, with a $SiO_2/Al_2O_3$ ratio of 5.15.

EXAMPLE XIV

In another example of this invention, 9,722 grams of caustic soda, containing 76 wt.-percent $Na_2O$, and 3,746 grams of sodium aluminate, containing 46.5 wt.-percent $Al_2O_3$, 30.4 wt.-percent $Na_2O$ and 23.1 wt.percent $H_2O$, were dissolved in 47,632 grams of water. After cooling to room temperature this solution was added to 68,900 grams of an aqueous colloidal silica sol containing 30.0 wt.-percent $SiO_2$ with vigorous agitation. The resultant mixture, which had the molar composition:

$$8.0\ Na_2O:Al_2O_3:20\ SiO_2:320\ H_2O$$

was mixed for 15 minutes. The resulting mixture was allowed to digest quiescently at room temperature for 28 hours. Next, the mixture was pumped through a steam-heated heat exchanger with a gear pump. The temperature of the discharged preparation varied from 180° F. to 200° F. with the bulk of the material discharged at 190° F. The heated material was collected in a jacketed kettle which was maintained at 96° C. for 48 hours. The crystalline product was filtered, washed and dried. The product weighed approximately 12 pounds. The crystalline product was characterized by X-ray and adsorption measurements as virtually 100% zeolite Y with an $SiO_2/Al_2O_3$ ratio of 5.1. At −183° C. and 100 mm. Hg the activated zeolite adsorbed 33 wt.-percent oxygen.

EXAMPLE XV

The weights of reactants and oxide ratios were the same as in Example XIV, except that 41,678 grams of water were used in making up the initial reactant mixture, giving a molar $H_2O/Na_2O$ ratio of 35 during the room-temperature digestion step which took 28 hours. For the second step of crystallization, the reactant mixture was heated to 180°–185° F. with a steam ejector. The resultant condensate and addition of more water brought the $H_2O/Na_2O$ ratio up to 40. The crystallization step was then conducted for 51 hours at 97° C. The crystalline product, weighing approximately 12 pounds, was characterized by X-ray and adsorption measurements as virtually 100% zeolite Y with a $SiO_2/Al_2O_3$ ratio of 5.1. At −183° C. and 100 mm. Hg the activated zeolite Y adsorbed 35.8 wt.-percent oxygen.

EXAMPLE XVI

In another example of this invention, 5720 grams of sodium hydroxide and 1695 grams of sodium aluminate were dissolved with agitation in 5.65 gallons of water. After cooling to room temperature, this solution was added to 40,500 grams of an aqueous colloidal silica sol with agitation. The resultant mixture, which had a composition in terms of oxide mole ratios corresponding to

| | |
|---|---|
| $Na_2O/SiO_2$ | 0.42 |
| $SiO_2/Al_2O_3$ | 27 |
| $H_2O/Na_2O$ | 33 | was mixed for 7 minutes. The bulk of this mixture was allowed to digest quiescently at room-temperature for 17 hours. Next the mixture, having been put into one-gallon glass vessels and sealed, was transferred to an oven. The reaction temperature during this second step was maintained at 100° C. for a period of 48 hours. At the end of the crystallization step the crystalline product was separated from the mother liquor by filtration, washed and dried. By means of X-ray and adsorption measurements the crystalline product was characterized as virtually 100% zeolite Y. The lattice constant $a_0$ was found to be 24.62, indicating a structural $SiO_2/Al_2O_3$ content of 5.1.

EXAMPLE XVII

In another example of this invention, 10.86 grams of sodium aluminate, containing 30.7 wt.-percent $Na_2O$, 46.4 wt.-percent $Al_2O_3$ and 23.1 wt.-percent $H_2O$, and 11.6 grams of sodium hydroxide containing 76.5 wt.-percent $Na_2O$ were dissolved in 67 grams of water. After cooling this solution was added to 100 grams of an aqueous colloidal silica sol containing 30.2 wt.-percent $SiO_2$. The resultant mixture, having the molar composition $$4\ Na_2O:Al_2O_3:10\ SiO_2:160\ H_2O$$

was stirred until homogeneous. The glass reaction vessel was sealed and allowed to stand quiescently at room temperature for 24 hours. Next the vessel was placed in a steam bath at 100° C. and allowed to digest for 48 hours. The solids were separated from the mother liquor by filtration, washed to a pH of about 8, and dried at 110° C. By means of X-ray techniques the crystalline product was characterized as 92% zeolite Y having a $SiO_2/Al_2O_3$ ratio of about 5.0.

The following example demonstrates the effect of an overlengthened elevated-temperature digestion step on the nature of the solid product.

EXAMPLE XVIII

Another portion of the same initial reactant mixture prepared in Example XVI ($Na_2O/SiO_2$=0.42; $SiO_2/Al_2O_3$=27; $H_2O/Na_2O$=33) was allowed to digest quiescently at room temperature for 65 hours and then crystallized at 100° C. for 96 hours. The solid product was found by X-ray and adsorption measurements to contain approximately 60% zeolite Y having a $SiO_2/Al_2O_3$ content of below 5, and contaminating amounts of another crystalline sodium aluminosilicate.

EXAMPLE XIX

In still another example of this invention 39.6 g. of sodium hydroxide (containing 74 wt.-percent $Na_2O$ and 26 wt.-percent $H_2O$) and 6.1 g. of sodium aluminate (containing 29.8 wt.-percent $Na_2O$, 46.4 wt.-percent $Al_2O_3$, and 23.2 wt.-percent $H_2O$), were dissolved in 243 g. of water and the solution then cooled to room temperature. The cooled solution was added to a slurry of 41.9 g. of silica gel (Davison grade 63 containing 99 wt.-percent $SiO_2$ and 1 wt.-percent water) in 243 g. of water, with agitation. The mixing was continued for about 2 minutes. The resulting mixture had the following composition, expressed in terms of oxide mole ratios:

| | |
|---|---|
| $Na_2O/SiO_2$ | 0.75 |
| $SiO_2/Al_2O_3$ | 25 |
| $H_2O/Na_2O$ | 55 |

This resulting reactant mixture was allowed to digest at ambient temperature for 113 hours. The reactant mixture was then heated to 100° C. and maintained at that temperature for 23 hours. The crystalline product was then filtered, washed and dried. X-ray analysis showed the product to be 90% zeolite Y and 10% crystalline impurities. Chemical analysis showed the Y zeolite to have a silica/alumina mole ratio of 3.6. When the first step digestion at ambient temperature was omitted from the above process, the product contained 75% Y zeolite and 25% of other crystalline materials.

EXAMPLE XX

In another example of the invention, 3.4 g. of sodium hydroxide (containing 74 wt.-percent $Na_2O$ and 26 wt.-percent $H_2O$) and 3.19 gm. of sodium aluminate (containing 29.8 wt.-percent $Na_2O$, 46.4 wt.-percent $Al_2O_3$, and 23.2 wt.-percent $H_2O$), were dissolved in 20 gm. water and the solution then cooled to room temperature. The cooled solution was added to a slurry of 9.96 gm. of QUSO (a fine particle silica precipitated from a silica sol, manufactured by Philadelphia Quartz Company, containing 87% $SiO_2$) in 19.1 gm. of water, with agitation. The mixing was continued for about 2 minutes. The resulting mixture had the following composition, expressed in terms of oxide mole ratios:

| | |
|---|---|
| $Na_2O/SiO_2$ | 0.40 |
| $SiO_2/Al_2O_3$ | 10 |
| $H_2O/Na_2O$ | 40 |

This resulting mixture was allowed to digest at ambient temperature for 24 hours. The reactant mixture was then heated to 100° C. and maintained at that temperature for 41 hours. The crystalline product was then filtered, washed and dried. X-ray analysis showed the product to be 93% zeolite Y with no other crystalline materials present. Chemical analysis showed the Y zeolite to have a silica/alumina mole ratio of 4.42.

EXAMPLE XXI

In another example of the invention, 22.3 gm. of sodium hydroxide (containing 74 wt.-percent $Na_2O$ and 26 wt.-percent $H_2O$) and 5.43 gm. of sodium aluminate (containing 29.8 wt.-percent $Na_2O$, 46.4 wt.-percent $Al_2O_3$, and 23.2 wt.-percent $H_2O$), were dissolved in 215 gm. of water and the solution then cooled to room temperature. To the cooled solution was added 30.9 gm. of Santocel "CS" (a fine powder aerogel silica, containing >99 wt.-percent $SiO_2$), with agitation. The mixing was continued for about 2 minutes. The resulting mixture had the following composition, expressed in terms of oxide mole ratios:

| | |
|---|---|
| $Na_2O/SiO_2$ | 0.61 |
| $SiO_2/Al_2O_3$ | 20 |
| $H_2O/Na_2O$ | 41 |

The reactant mixture was then heated to 100° C. and maintained at that temperature for 22 hours. The crystalline product was then filtered, washed and dried. X-ray analysis showed the product to be 98% zeolite Y with no other crystalline materials present. Chemical analysis showed the Y zeolite to have a silica-alumina mole ratio of 3.80.

EXAMPLE XXII

In another example of the invention, 44.4 gm. of sodium hydroxide (containing 74 wt.-percent $Na_2O$ and 26 wt.-percent $H_2O$) and 10.86 gm. sodium aluminate (containing 29.8 wt.-percent $Na_2O$, 46.4 wt.-percent $Al_2O_3$, and 23.2 wt.-percent $H_2O$), were dissolved in 432 gm. of water and the solution then cooled to room temperature. To the cooled solution was added 59.9 gm. of fume $SiO_2$, with agitation. The mixing was continued for about 2 minutes. The fine powder fume silica was prepared by the vaporization of SiO and was greater than 99 wt.-percent $SiO_2$ with a particle size of 50–2000 A. This resultant mixture had the following compositions, expressed in terms of oxide mole ratios:

| | |
|---|---|
| $Na_2O/SiO_2$ | 0.61 |
| $SiO_2/Al_2O_3$ | 20 |
| $H_2O/Na_2O$ | 41 |

The reactant mixture was then heated to 100° C. and maintained at that temperature for 16 hours. The crystalline product was then filtered, washed and dried. X-ray analysis showed the product to be 100% zeolite Y. Chemical analysis showed the Y zeolite to have a silica/alumina mole ratio of 3.83.

EXAMPLE XXIII

In another example of the invention, 23.2 gm. of sodium hydroxide (containing 74 wt.-percent $Na_2O$ and 26 wt.-percent $H_2O$) and 21.72 gm. of sodium aluminate (containing 29.8 wt.-percent $Na_2O$, 46.4 wt.-percent $Al_2O_3$, and 23.2 wt.-percent $H_2O$), were dissolved in 274 gm. of water and the solution then cooled to room temperature. To the cooled solution was added 59.9 gm. of the fume $SiO_2$ of Example XXII, with agitation. The mixing was continued for about 2 minutes. The resulting mixture was allowed to digest at ambient temperature for 24 hours. This mixture had the following composition, expressed in terms of oxide mole ratios:

| | |
|---|---|
| $Na_2O/SiO_2$ | 0.40 |
| $SiO_2/Al_2O_3$ | 10 |
| $H_2O/Na_2O$ | 40 |

The reactant mixture was then heated to 100° C. and maintained at that temperature for 43 hours. The crystalline product was then filtered, washed and dried. X-ray analysis showed the product to be 100% zeolite Y. Chemical analysis showed the Y zeolite to have a silica/alumina mole ratio of 4.42.

EXAMPLE XXIV

In another example of the invention, 2.8 gm. of sodium hydroxide (containing 74 wt.-percent $Na_2O$ and 26 wt.-percent $H_2O$) and 1.11 gm. of sodium aluminate (containing 29.8 wt.-percent $Na_2O$, 46.4 wt.-percent $Al_2O_3$, and 23.2 wt.-percent $H_2O$), were dissolved in 16 gm. of water and the solution then cooled to room temperature. The cooled solution was added to a slurry of 6.0 gm. of ground fused silica glass (96% $SiO_2$) in 10 gm. of water, with agitation. The mixing was continued for about 2 minutes. The resulting mixture was allowed to digest with agitation at ambient temperature for 24 hours. This mixture had the following composition, expressed in terms of oxide mole ratios:

| | |
|---|---|
| $Na_2O/SiO_2$ | 0.40 |
| $SiO_2/Al_2O_3$ | 20 |
| $H_2O/Na_2O$ | 40 |

The reactant mixture was then heated to 100° C. and maintained at that temperature for 28 hours. The crystalline product was then filtered, washed and dried. X-ray analysis showed the product to be 61% zeolite Y and no other crystalline material present. Chemical analysis showed the Y zeolite to have a silica/alumina mole ratio of 4.44.

The increase in the product silica-to-alumina mole ratio of zeolite Y without the alteration of the basic sodium zeolite Y framework is believed to be due to the substitution of $Si^{+4}$ for $Al^{+3}$ ions during the synthesis process. The $Al^{+3}$ ion is larger (radius=0.57 A) than the $Si^{+4}$ ion (radius=0.39 A). As the silica-to-alumina molar ratio increases, the smaller $SiO_2$ tetrahedra substitute for the larger $AlO_4$ tetrahedra, and there is a small but real decrease in the unit cell volume as indicated by measurement of the value of the crystal lattice cubic unit cell constant, $a_0$. Thus, for zeolite Y compositions having $SiO_2/Al_2O_3$ molar ratios ranging from greater than 3 up to about 3.9 the unit cell constant, $a_0$, changes from 24.87 A to 24.77 A. Further evidence of the regular decrease in unit cell dimensions with increase in structural $SiO_2/Al_2O_3$ contents is found by measurement of $a_0$ on the higher silica-to alumina zeolite Y compositions. For example, a sodium zeolite Y product having a structural $SiO_2/Al_2O_3$ content of 5.33 has a crystal lattice constant $a_0$=24.59 A. For zeolite Y compositions having a silica-to-alumina molar ratio between 3.9 and 6 the cell constant $a_0$ has values between about 24.77 A and 24.516 A and for a molar ratio between 5 and 6 the cell constant $a_0$ has values between about 24.635 A and 24.516 A. If the higher $SiO_2/Al_2O_3$ ratios found in some zeolite Y compositions were merely due to the presence of amorphous or nonstructural $SiO_2$, no change in the cell dimension $a_0$ would be observed.

Because of the observed decrease in unit cell dimensions there is necessarily a small but real shift observed in the positions of particular interplanar or $d$-spacings which characterize the zeolite Y compositions having higher $SiO_2/Al_2O_3$ molar ratios according to the following relationship for a cubic crystal familiar to those skilled in the art of crystallography or X-ray diffraction:

$$d_{h,k,l} = \frac{a_0}{\sqrt{h^2+k^2+l^2}}$$

where $h$, $k$, and $l$ are the Miller indices. Accordingly, while the relative intensities of the lines remain about the same, the ranges of values of $d$ for sodium zeolite Y having a silica-to-alumina molar ratio greater than 3 up to about 5 differ somewhat from the values of $d$ for sodium zeolite Y having a silica-to-alumina molar ratio between 5 and 6. The basic structure of the sodium zeolite Y compositions for the full range of silica-to-alumina mole ratios as shown in Table A is the same, but the particular X-ray tables shown below are useful in identifying and characterizing sodium zeolite Y compositions within the corresponding $SiO_2/Al_2O_3$ ranges. Occasionally minor variations in intensities and/or positions of the lines or peaks in the X-ray diffraction patterns of sodium zeolite Y compositions may be observed, due to variables such as the particular X-ray technique and/or apparatus employed, orientation of the powder crystals, etc., without hindering the establishment of the identity of sodium zeolite Y by those skilled in the crystallographic or X-ray diffraction art. Sodium zeolite Y having a $SiO_2/Al_2O_3$ mole ratio greater than 3 up to about 5 has an X-ray powder diffraction pattern essentially as shown in Table B below, whereas sodium zeolite Y having a $SiO_2/Al_2O_3$ mole ratio between 5 and 6 has an X-ray pattern essentially as shown in Table C, below.

The values for the interplanar spacing, $d$, are expressed in angstrom units (A.). The relative intensity of the lines of the X-ray powder diffraction pattern are expressed as VS, very strong; S, strong; M, medium; W, weak; and VW, very weak. The X-ray powder diffraction pattern data of Tables B and C were obtained on a Geiger counter spectrometer with pen recorder using filtered copper K-alpha radiation.

TABLE B

| hkl | $h^2+k^2+l^2$ | d in A | Intensity |
|---|---|---|---|
| 111 | 3 | 14.3–14.4 | VS |
| 220 | 8 | 8.73–8.80 | M |
| 311 | 11 | 7.45–7.50 | M |
| 331 | 19 | 5.67–5.71 | S |
| 333, 511 | 27 | 4.75–4.79 | M |
| 440 | 32 | 4.37–4.46 | M |
| 620 | 40 | 3.90–3.93 | W |
| 533 | 43 | 3.77–3.79 | S |
| 444 | 48 | 3.57–3.59 | VW |
| 551, 711 | 51 | 3.46–3.48 | VW |
| 642 | 56 | 3.30–3.33 | S |
| 553, 731 | 59 | 3.22–3.24 | W |
| 733 | 67 | 3.02–3.04 | M |
| 660, 822 | 72 | 2.90–2.93 | M |
| 555, 751 | 75 | 2.85–2.87 | S |
| 840 | 80 | 2.76–2.78 | M |
| 753, 911 | 83 | 2.71–2.73 | W |
| 664 | 88 | 2.63–2.65 | M |
| 931 | 91 | 2.59–2.61 | M |
| 844 | 96 | 2.52–2.54 | VW |
| 862; 10, 2, 0 | 104 | 2.42–2.44 | VW |
| 666; 10, 2, 2 | 108 | 2.38–2.39 | M |
| 775; 11, 1, 1 | 123 | 2.22–2.24 | VW |
| 880 | 128 | 2.18–2.20 | W |
| 955; 971; 11, 3, 1 | 131 | 2.16–2.18 | VW |
| 973; 11, 3, 3 | 139 | 2.10–2.11 | W |
| 884; 12, 0, 0 | 144 | 2.06–2.07 | VW |
| 886; 10, 8, 0; 12, 4, 2 | 164 | 1.93–1.94 | VW |
| 10, 8, 2 | 168 | 1.91–1.92 | VW |
| 995; 13, 3, 3 | 187 | 1.81–1.82 | VW |
| 11, 7, 5; 13, 5, 1 | 195 | 1.77–1.78 | VW |
| 10, 8, 6; 10, 10, 0; 14, 2, 0 | 200 | 1.75–1.76 | W |
| 997; 11, 9, 3 | 211 | 1.70–1.71 | W |

TABLE C

| $h^2+k^2+l^2$ | d, A. | Relative Intensity |
|---|---|---|
| 3 | 14.15–14.3 | VS |
| 8 | 8.67–8.73 | M |
| 11 | 7.39–7.45 | M |
| 19 | 5.62–5.67 | S |
| 24 | 5.00–5.02 | W |
| 27 | 4.72–4.75 | M |
| 32 | 4.33–4.37 | M |
| 40 | 3.88–3.90 | W |
| 43 | 3.74–3.77 | S |
| 48 | 3.54–3.57 | VW |
| 51 | 3.43–3.46 | VW |
| 56 | 3.28–3.30 | S |
| 59 | 3.19–3.22 | W |
| 67 | 3.00–3.02 | M |
| 72 | 2.89–2.90 | M |
| 75 | 2.83–2.85 | S |
| 80 | 2.74–2.76 | M |
| 83 | 2.69–2.71 | W |
| 88 | 2.61–2.63 | M |
| 91 | 2.57–2.59 | M |
| 96 | 2.50–2.52 | VW |
| 104 | 2.40–2.42 | VW |
| 108 | 2.36–2.38 | M |
| 123 | 2.21–2.22 | VW |
| 128 | 2.17–2.18 | W |
| 131 | 2.14–2.16 | VW |
| 139 | 2.03–2.10 | W |
| 144 | 2.04–2.06 | VW |
| 164 | 1.91–1.93 | VW |
| 168 | 1.89–1.91 | VW |
| 187 | 1.79–1.81 | VW |
| 195 | 1.76–1.77 | VW |
| 200 | 1.73–1.75 | W |
| 211 | 1.69–1.70 | W |

Measurement of the lattice constant, $a_0$, conveniently conducted by means of careful X-ray spectrometer scanning, therefore provides a reliable method for determining the structural $SiO_2/Al_2O_3$ content of zeolite Y products made by the process of the invention, once the relationship between the lattice constant and $SiO_2/Al_2O_3$ content has been established. This method is combined with other information such as wet chemical analyses, X-ray fluorescence studies, quantitative X-ray measurements, adsorption measurements, hydrolytic stability data and electrical properties measurements for complete characterization and differentiation of zeolite Y products. In the data presented herein, the terms "product composition" and "percent zeolite Y" refer to the percentage of zeolite Y in the solid product based on quantitative X-ray and/or adsorption measurements referred to standard zeolite Y samples as follows:

For quantitative X-ray analysis, $$\frac{I_1}{I_2} \times 100 = \text{percent zeolite Y}$$

where $I_1$ = sum of intensities of suitable X-ray lines measured on the zeolite Y sample, and $I_2$ = sum of intensities of the same X-ray lines measured on the zeolite Y reference standard.

For quantitative adsorption analysis, $$\frac{W_1}{W_2} \times 100 = \text{percent zeolite Y}$$

where $W_1$ = Weight loading of adsorbate measured on the activated zeolite Y sample, and $W_2$ = Weight loading of same adsorbate measured on the activated zeolite Y reference standard.

In the preferred form of the invention activated zeolite Y compositions adsorb at least about 30 wt.-percent oxygen at 100 mm. Hg and $-183°$ C.

Zeolite Y crystals may be activated by heating in such a manner as to effect the loss of the water of hydration. Zeolite Y may be activated by heating it in air or vacuum or other appropriate gas. Temperatures as high as about 700° C. have been found to be satisfactory for activation; an activation temperatures of 350° C. in an ultimate vacuum of $10^{-5}$ mm. Hg is often used. This leaves a crystal structure interlaced with channels of molecular dimensions offering very high surface area for the adsorption of foreign molecules and readsorption of water. Adsorption is limited to molecules having a size and shape such as to permit entrance through the pores to the inner sorption area, all other molecules being excluded.

Zeolite Y has been found to have particularly good adsorption characteristics as is demonstrated by the representative adsorption data in Table VIII.

TABLE VIII

| Adsorbate | Pressure, mm. Hg | Temperature, ° C. | Wt.-Percent Adsorbed |
|---|---|---|---|
| $H_2O$ | 25 | 25 | 35.2 |
| $CO_2$ | 700 | 25 | 26.0 |
| n-pentane | 200 | 25 | 14.9 |
| $(C_4F_9)_3N$ | 0.07 | 25 | 1.1 |
| $(C_4H_9)_3N$ | 0.5 | 50 | 21.4 |
| Krypton | 20 | −183 | 70.0 |
| Oxygen | 700 | −183 | 35.7 |

These data were obtained in the following manner:

Samples of zeolite Y which had been activated by dehydration at a temperature of approximately 350° C., under vacuum, were tested to determine their adsorption properties. The adsorption properties were measured in a McBain-Bakr adsorption system. The zeolite samples were placed in light aluminum buckets suspended from quartz springs. They were activated in situ, and the gas or vapor under test was then admitted to the system. The gain in weight of the adsorbent was measured by the spring extensions as read by a cathetometer. In Table VIII the pressure given for each adsorption is the pressure of the adsorbate. The term "weight percent adsorbed" in the table refers to the percentage increase in the weight of the activated adsorbent.

As may be seen from the adsorption data in Table VIII activated zeolite Y can be employed to separate molecules having a critical dimension greater than that of heptocosafluorotributylamine from molecules having smaller critical dimensions. The critical dimension of a molecule is defined as the diameter of the smallest cylinder which will accommodate a model of the molecule constructed using the best available van der Waals radii, bond angles, and bond lengths.

A unique property of zeolite Y is its strong preference for polar, polarizable and unsaturated molecules, providing, of course, that these molecules are of a size and shape which permits them to enter the pore system. This is in contrast to charcoal and silica gel which show a primary preference based on the volatility of the adsorbate.

The reactivation or regeneration methods that may be used with zeolite Y differ from those used for the common adsorbents. Under the conditions of activation, reactivation or regeneration found to be satisfactory for zeolite Y, most other common adsorbents are either partially or completely destroyed by the heat or oxidized by the air. The conditions used for desorption of an adsorbate from zeolite Y vary with the adsorbate but either one or a combination of raising the temperature and reducing the pressure, partial pressure or concentration of the adsorbate in contact with the adsorbent is usually employed. Another method is the displacement of the adsorbate by adsorption of another more strongly held adsorbate. For example, the desorption of occluded molecules from zeolite Y may be effected by washing with water or steam or by purging with a gas while heating, or by vacuum treatment.

Zeolite Y is distinguished from other molecular sieve types, for example zeolite X, described in U.S. Patent No. 2,882,244, by its exceptional stability toward steam at elevated temperatures. This is a property which makes zeolite Y particularly suitable for such processes as gas drying, especially where the adsorbent bed must withstand numerous adsorption-desorption cycles. Zeolite Y is hydrolytically more stable than zeolite X. To demonstrate the improved hydrolytic stability afforded by zeolite Y the data of Table IX are presented. The relative hydrolytic stability was determined by measurement of the oxygen adsorption capacities of zeolite Y and zeolite X before and after heating in the presence of saturated steam at 410° C. and atmospheric pressure for three hours.

TABLE IX

| Zeolitic Molecular Sieve | Molar $SiO_2$/$Al_2O_3$ Content | Percent of Original Oxygen Capacity Retained after Steaming [1] |
|---|---|---|
| X | 2.2 | 11 |
| X | 2.5 | 9 |
| X | 2.7 | 17.5 |
| Y | 3.4 | 72 |
| Y | 3.8 | 80 |
| Y | 4.4 | 81 |
| Y | 4.6 | 87 |
| Y | 5.1 | 97 |
| Y | 5.3 | 90 |

[1] Measured at −183° C. and 100 mm. Hg.

Another means of differentiating zeolite Y compositions having a product silica-to-alumin molar ratio greater than 3 up to about 6 from zeolite X is by examination of the electrical properties of the particular species. The specific conductivity at several temperatures, as determined from resistance measurements made with specially-constructed A.C. impedance bridges, and the values of activation energy (ΔH) required for ionic conductivity in sodium zeolite X and sodium zeolite Y compositions are given in Table X below.

TABLE X

| Zeolite Type and Molar $SiO_2$/$Al_2O_3$ Content | Specific Conductivity, $ohm^{-1}$ $cm.^{-1}$ at temperature | | Activation Energy (ΔH), Kcal./mole |
|---|---|---|---|
| | 143.6° C. | −282.5° C. | |
| X 2.4 | $2.0 \times 10^{-5}$ | $8.0 \times 10^{-4}$ | 12.0 |
| X 3.0 | $5.4 \times 10^{-6}$ | $2.1 \times 10^{-4}$ | 12.2 |
| Y 3.8 | $1.6 \times 10^{-6}$ | $9.0 \times 10^{-5}$ | 13.7 |
| Y 4.5 | $2.4 \times 10^{-7}$ | $2.4 \times 10^{-5}$ | 15.6 |
| Y 5.1 | $5.0 \times 10^{-8}$ | $5.0 \times 10^{-6}$ | 16.0 |
| Y 5.3 | | [1] $2.9 \times 10^{-6}$ | 16.3 |

[1] Measured at 298° C.

A simple test described in "American Mineralogist," vol. 28, page 545 (1943), permits a quick check of the silicon to aluminum ratio of zeolite Y. According to the description of the test, zeolite minerals with a three-dimensional network that contain aluminum and silicon atoms in an atomic ratio Al/Si=2/3=0.67, or greater, produce a gel when treated with hydrochloric acid. Most zeolites having smaller aluminum to silicon ratios disintegrate in the presence of hydrochloric acid and precipitate silica. When a sample of sodium zeolite Y powder having an Al/Si ratio of 0.5 was mixed wtih water and hydrochloric acid and then heated, silica precipitated from solution. When a sample of sodium zeolite X powder, having an Al/Si ratio of 0.71, was similarly treated, a gel formed.

Another characteristic by which zeolite Y may be distinguished from zeolite X is brought out by comparing the effect of calcium exchange on the adsorption behavior of zeolite X and zeolite Y. Calcium-exchanged zeolite X and calcium-exchanged zeolite Y were activated at 350° C. under vacuum. The adsorption capacity of these zeolites for three tertiary amines, $(C_2F_5)_2NC_3F_7$, $(C_3H_7)_3N$ and $(C_4H_9)_3N$, was measured at 25° C. and at adsorption pressures of 43, 3 and 1 mm. Hg, respectively, using the McBain-Bakr adsorption method. The data are given in the following table:

EFFECT OF CALCIUM EXCHANGE OF ZEOLITE X AND ZEOLITE Y ON ADSORPTION OF AMINES

| Adsorbate | Critical Dimension, A. | Adsorptive Capacity [1] | |
|---|---|---|---|
| | | CaX [a] | CaY [b] |
| $(C_2F_5)_2NC_3F_7$ | 8.7 | 48.7 | 52.9 |
| $(C_3H_7)_3N$ | 9.1 | 1.8 | 21.6 |
| $(C_4H_9)_3N$ | 9.1 | 1.2 | 21.0 |

[1] Grams adsorbed per gram of activated zeolite ×100.
[a] $SiO_2/Al_2O_3=2.5$, 84% Ca-exchanged.
[b] $SiO_2/Al_2O_3=4.8$, 85% Ca-exchanged.

These results show that zeolite Y, after having undergone exchange with calcium ion, is able to accept a substantial quantity (around 21 wt. percent) of molecules having a critical dimension of 9.1 A., where zeolite X, also calcium exchange, adsorbs less than 2 wt. percent of the same molecular species. These results show that calcium exchange of zeolite Y does not effect a pore size change, in contrast to the effect commonly encountered in zeolitic molecular sieves.

Zeolite Y may be used as an adsorbent in any suitable form. Powdered crystalline materials have given excellent results as have pelleted forms. The pelleted forms may be obtained by pressing into pellets a mixture of zeolite Y and a suitable bonding agent such as clay.

This application is a continuation-in-part of application Serial No. 862,062, filed December 28, 1959, which is itself a continuation-in-part of application Serial No. 728,057, filed April 14, 1958, both now abandoned.

What is claimed is:

1. A synthetic, crystalline, zeolitic sodium aluminosilicate of the molecular sieve type having a composition, expressed in terms of oxide-mole-ratios, as follows:

$$0.9\pm0.2\ Na_2O:Al_2O_3:w\ SiO_2:x\ H_2O$$

wherein "$w$" is a value greater than 3 and up to about 6 and "$x$" may be a value up to about 9, said sodium aluminosilicate having an X-ray powder diffraction pattern essentially the same as that shown in Table A.

2. A synthetic, crystalline, zeolitic sodium aluminosilicate of the molecular sieve type having a composition, expressed in terms of oxide-mol-ratios, as follows:

$$0.9\pm0.2\ Na_2O:Al_2O_3:w\ SiO_2:x\ H_2O$$

Wherein "$w$" is a value from about 3.9 and up to about 6 and "$x$" may be a value up to about 9, said sodium aluminosilicate having an X-ray powder diffraction pattern essentially the same as that shown in Table A.

3. A synthetic, dehydrated crystalline, zeolitic sodium aluminosilicate of the molecular sieve type having a composition, expressed in terms of oxide-mole-ratios, as follows:

$$0.9\pm0.2\ Na_2O:Al_2O_3:w\ SiO_2$$

wherein "$w$" is a value from about 3.9 and up to about 6, said sodium aluminosilicate having an X-ray powder diffraction pattern essentially the same as that shown in Table A.

4. A synthetic, crystalline, zeolitic sodium aluminosilicate of the molecular sieve type having a composition, expressed in terms of oxide-mole-ratios, as follows:

$$0.9\pm0.2\ Na_2O:Al_2O_3:w\ SiO_2:x\ H_2O$$

wherein "$w$" is a value from about 3.9 and up to about 5 and "$x$" may be a value up to about 9, said sodium aluminosilicate having an X-ray powder diffraction pattern essentially the same as that shown in Table B.

5. A synthetic, crystalline, zeolitic sodium aluminosilicate of the molecular sieve type having a composition, expressed in terms of oxide-mol-ratios, as follows:

$$0.9\pm0.2\ Na_2O:Al_2O_3:w\ SiO_2:x\ H_2O$$

wherein "$w$" is a value greater than 3 and up to about 5 and "$x$" may be a value up to about 9, said sodium aluminosilicate having an X-ray powder diffraction pattern essentially the same as that shown in Table B.

6. A synthetic, dehydrated crystalline, zeolitic sodium aluminosilicate of the molecular sieve type having a composition, expressed in terms of oxide-mole-ratios, as follows:

$$0.9\pm0.2\ Na_2O:Al_2O_3:w\ SiO_2$$

wherein "$w$" is a value greater than 3 and up to about 5, said dehydrated sodium aluminosilicate having an X-ray powder diffraction pattern essentially the same as that shown in Table B.

7. A synthetic, crystalline, zeolitic sodium aluminosilicate of the molecular sieve type having a composition, expressed in terms of oxide-mole-ratios, as follows:

$$0.9\pm0.2\ Na_2O:Al_2O_3:w\ SiO_2:x\ H_2O$$

wherein "$w$" is a value from about 5 up to about 6 and "$x$" may be a value up to about 9, said sodium aluminosilicate having an X-ray powder diffraction pattern essentially the same as that shown in Table C.

8. A synthetic, dehydrated crystalline, zeolitic sodium aluminosilicate of the molecular sieve type having a composition, expressed in terms of oxide-mol-ratios, as follows:

$$0.9\pm0.2\ Na_2O:Al_2O_3:w\ SiO_2$$

wherein "$w$" is a value from about 5 and up to about 6, said dehydrated sodium aluminosilicate having an X-ray powder diffraction pattern essentially the same as that shown in Table C.

9. A process for preparing zeolite Y which comprises preparing an aqueous sodium aluminosilicate mixture having a composition, expressed in terms of oxide-mole-ratios falling within the following range:

| | |
|---|---|
| $Na_2O/SiO_2$ | 0.20 to 0.40 |
| $SiO_2/Al_2O_3$ | 10 to 40 |
| $H_2O/Na_2O$ | 25 to 60 | wherein the major source of silica in said mixture is selected from the group consisting of an aqueous colloidal silica sol and a reactive amorphous solid silica; maintaining said mixture at a temperature in the range of from about 20° C. to about 125° C. until crystals are formed; and separating the crystals from the mother liquor.

10. A process as described in claim 9 wherein fume silica is said major source of silica and the oxide-mole-ratio range is about as follows:

| | |
|---|---|
| $Na_2O/SiO_2$ | 0.41 to 0.60 |
| $SiO_2/Al_2O_3$ | 10 to 30 |
| $H_2O/Na_2O$ | 20 to 60 |

11. A process as described in claim 9 wherein the oxide-mole ratio range is about as follows:

| | |
|---|---|
| $Na_2O/SiO_2$ | 0.61 to 0.80 |
| $SiO_2/Al_2O_3$ | 7 to 30 |
| $H_2O/Na_2O$ | 20 to 60 |

12. A process for preparing zeolite Y which comprises preparing an aqueous sodium aluminosilicate mixture having a composition, expressed in terms of oxide-mole-ratios falling within the following range:

| | |
|---|---|
| $Na_2O/SiO_2$ | 0.20 to 0.40 |
| $SiO_2/Al_2O_3$ | 10 to 40 |
| $H_2O/Na_2O$ | 25 to 60 | wherein the major source of silica in said mixture is an aqueous collodial silica sol; maintaining said mixture at a temperature in the range of from about 20° C. to about 125° C. until crystals are formed; and separating the crystals from the mother liquor.

13. A process as described in claim 12 wherein the oxide-mole-ratio range is about as follows:

| | |
|---|---|
| $Na_2O/SiO_2$ | 0.41 to 0.60 |
| $SiO_2/Al_2O_3$ | 10 to 30 |
| $H_2O/Na_2O$ | 20 to 60 |

14. A process as described in claim 12 wherein the oxide-mole-ratio range is about as follows:

| | |
|---|---|
| $Na_2O/SiO_2$ | 0.61 to 0.80 |
| $SiO_2/Al_2O_3$ | 7 to 30 |
| $H_2O/Na_2O$ | 20 to 60 |

15. A process for preparing zeolite Y which comprises preparing an aqueous sodium aluminosilicate reactant mixture having a composition, expressed in terms of oxide-mole-ratios, falling within the following range:

| | |
|---|---|
| $Na_2O/SiO_2$ | 0.20 to 0.40 |
| $SiO_2/Al_2O_3$ | 10 to 40 |
| $H_2O/Na_2O$ | 25 to 60 | wherein the major source of silica in said mixture is selected from the group consisting of an aqueous colloidal silica sol and a reactive amorphous solid silica; maintaining said reactant mixture at about ambient temperature for at least 16 hours but not more than about 40 hours; heating said reactant mixture to between about 90° C. and about 105° C.; maintaining said reactant mixture at between about 90° C. and about 105° C. until crystals are formed; and separating the crystals from the mother liquor.

16. A process as described in claim 15 wherein the oxide-mole-ratio range is about as follows:

| | |
|---|---|
| $Na_2O/SiO_2$ | 0.41 to 0.60 |
| $SiO_2/Al_2O_3$ | 10 to 30 |
| $H_2O/Na_2O$ | 20 to 60 |

17. A process for preparing zeolite Y which process comprises preparing an aqueous sodium aluminosilicate reactant mixture, the major source of silica in said reactant mixture being selected from the group consisting of sodium silicate, silica gel and silicic acid, said reactant mixture having a composition expressed in terms of oxide-mole-ratios, which falls within the range:

| | |
|---|---|
| $Na_2O/SiO_2$ | 0.6 to 1.0 |
| $SiO_2/Al_2O_3$ | 8 to 30 |
| $H_2O/Na_2O$ | 12 to 90 | maintaining said mixture at a temperature in the range of from about 20° C. to about 125° C. until crystals are formed, and separating the crystals from the mother liquor.

18. A process as described in claim 17 wherein the oxide-mole-ratio range is about as follows:

| | |
|---|---|
| $Na_2O/SiO_2$ | 1.5 to 1.7 |
| $SiO_2/Al_2O_3$ | 10 to 30 |
| $H_2O/Na_2O$ | 20 to 90 |

19. A process as described in claim 17 wherein the oxide-mole-ratio range is about as follows:

| | |
|---|---|
| $Na_2O/SiO_2$ | 1.9 to 2.1 |
| $SiO_2/Al_2O_3$ | About 10 |
| $H_2O/Na_2O$ | 40 to 90 |

20. A process for preparing zeolite Y which process comprises preparing an aqueous sodium aluminosilicate reactant mixture, the major source of silica in said reactant mixture being sodium silicate, said reactant mixture having a composition, expressed in terms of oxide-mole-ratios, which falls within the range:

| | |
|---|---|
| $Na_2O/SiO_2$ | 0.6 to 1.0 |
| $SiO_2/Al_2O_3$ | 8 to 30 |
| $H_2O/Na_2O$ | 12 to 90 | maintaining said mixture at a temperature in the range of from about 20° C. to about 125° C. until crystals are formed, and separatin gthe crystals from the mother liquor.

21. A process as described in claim 20 wherein the oxide-mole-ratio range is about as follows:

| | |
|---|---|
| $Na_2O/SiO_2$ | 1.5 to 1.7 |
| $SiO_2/Al_2O_3$ | 10 to 30 |
| $H_2O/Na_2O$ | 20 to 90 |

22. A method as described in claim 20 wherein the oxide-mole-ratio range is about as follows:

| | |
|---|---|
| $Na_2O/SiO_2$ | 1.9 to 2.1 |
| $SiO_2/Al_2O_3$ | About 10 |
| $H_2O/Na_2O$ | 40 to 90 |

23. A process for preparing zeolite Y which process comprises preparing an aqueous sodium aluminosilicate reactant mixture, the major source of silica in said reactant mixture being selected from the group consisting of sodium silicate, silica gel and silicic acid, said reactant mixture having a composition expressed in terms of oxide-mole-ratios, which falls within the range:

| | |
|---|---|
| $Na_2O/SiO_2$ | 0.6 to 1.0 |
| $SiO_2/Al_2O_3$ | 8 to 30 |
| $H_2O/Na_2O$ | 12 to 90 | maintaining said reactant mixture at about ambient temperature for at least 16 hours but not more than about 40 hours; heating said reactant mixture to between about 90° C. and about 105° C.; maintaining said reactant mixture at between about 90° C. and about 105° C. until crystals are formed; and separating the crystals from the mother liquor.

24. A process for preparing zeolite Y which process comprises preparing an aqueous sodium aluminosilicate reactant mixture, the major source of silica in said reactant mixture being selected from the group consisting of an aqueous colloidal silica sol and a reactive amorphous solid silica, said reactant mixture having a composition, expressed in terms of oxide-mole-ratios, which falls within the range:

| | |
|---|---|
| $Na_2/SiO_2$ | 0.28–0.30 |
| $SiO_2/Al_2O_3$ | 8–10 |
| $H_2O/Na_2O$ | 30–50 | maintaining said reactant mixture at about ambient temperature; heating said reactant mixture to an elevated temperature; maintaining said reactant mixture at said elevated temperature until crystals are formed; and separating the crystals from the mother liquor.

25. A process for preparing zeolite Y which process comprises preparing an aqueous sodium aluminosilicate reactant mixture, the major source of silica in said reactant mixture being selected from the group consisting of an aqueous colloidal silica sol and a reactive amorphous solid silica, said reactant mixture having a composition, expressed in terms of oxide-mole-ratios, which falls within the range:

| | |
|---|---|
| $Na_2O/SiO_2$ | About 0.4 |
| $SiO_2/Al_2O_3$ | 10–27 |
| $H_2O/Na_2O$ | 30–50 | maintaining said reactant mixture at about ambient temperature; heating said reactant mixture to an elevated temperature; maintaining said reactant mixture at said elevated temperature until crystals are formed; and separating the crystals from the mother liquor.

26. A process for preparing zeolite Y which process comprises preparing an aqueous sodium aluminosilicate reactant mixture, the major source of silica in said reactant mixture being an aqueous colloidal silica sol, said reactant mixture having a composition, expressed in terms of oxide-mole-ratios, which falls within the range:

| | |
|---|---|
| $Na_2O/SiO_2$ | 0.28–0.30 |
| $SiO_2/Al_2O_3$ | 8–10 |
| $H_2O/Na_2O$ | 30–50 | maintaining said reactant mixture at about ambient temperature; heating said reactant mixture to an elevated temperature; maintaining said reactant mixture at said elevated temperature until crystals are formed; and separating the crystals from the mother liquor.

27. A process for preparing zeolite Y which process comprises preparing an aqueous sodium aluminosilicate reactant mixture, the major source of silica in said reactant mixture being an aqueous colloidal silica sol, said reactant mixture having a composition expressed in terms of oxide-mole-ratios, which falls within the range:

| | |
|---|---|
| $Na_2O/SiO_2$ | About 0.4 |
| $SiO_2/Al_2O_3$ | 10–27 |
| $H_2O/Na_2O$ | 30–50 | maintaining said reactant mixture at about ambient temperature for at least about 16 hours but not more than about 40 hours; heating said reactant mixture to between about 90° C. and about 105° C.; maintaining said reactant mixture at between about 90° C. and about 105° C. for at least about 24 and not more than about 65 hours to form crystals of zeolite Y; and separating the crystals from the mother liquor.

28. A process for preparing zeolite Y which process comprises preparing an aqueous sodium aluminosilicate reactant mixture, the major source of silica in said reactant mixture being an aqueous colloidal silica sol, said reactant mixture having a composition expressed in terms of oxide-mole-ratios, which falls within the range:

| | |
|---|---|
| $Na_2O/SiO_2$ | 0.28–0.3 |
| $SiO_2/Al_2O_3$ | 8–10 |
| $H_2O/Na_2O$ | 30–50 | maintaining said reactant mixture at about ambient temperature for at least about 20 hours but not more than about 40 hours; heating said reactant mixture to between about 90° C. and about 105° C.; maintaining said reactant mixture at between about 90° C. and about 105° C. for at least about 3 days and not more than about 8 days to form crystals of zeolite Y; and separating the crystals from the mother liquor.

29. A process for preparing zeolite Y which process comprises preparing an aqueous sodium aluminosilicate reactant mixture, the major source of silica in said reactant mixture being an aqueous colloidal silica sol and said reactant mixture having a composition, expressed in terms of oxide-mole-ratios, which falls within the range:

| | |
|---|---|
| $Na_2O/SiO_2$ | 0.4 |
| $SiO_2/Al_2O_3$ | 10–20 |
| $H_2O/Na_2O$ | About 40 | maintaining said reactant mixture at about ambient temperature for about 24 to about 32 hours; heating said reactant mixture to between about 95° C. and about 100° C.; maintaining said reactant mixture at between about 95° C. and about 100° C. for about 50 hours to form crystals of zeolite Y; and separating the crystals from the mother liquor.

30. A process for preparing zeolite Y which process comprises preparing an aqueous sodium aluminosilicate mixture, the major source of silica in said mixture being an aqueous colloidal silica sol, and said mixture having a composition expressed in terms of oxide-mole-ratios as follows:

| | |
|---|---|
| $Na_2O/SiO_2$ | About 0.6 |
| $SiO_2/Al_2O_3$ | 10 to 35 |
| $H_2O/Na_2O$ | About 41 | maintaining said mixture at a temperature in the range of from about 20° C. to about 175° C. until crystals are formed; and separating the crystals from the mother liquor.

References Cited in the file of this patent
UNITED STATES PATENTS

| | | |
|---|---|---|
| 2,882,244 | Milton | Apr. 14, 1959 |
| 2,979,381 | Gottstine et al. | Apr. 11, 1961 |